United States Patent [19]

Richeson et al.

[11] Patent Number: 5,203,535
[45] Date of Patent: Apr. 20, 1993

[54] CAM ACTUATED VALVE ASSEMBLY WITH HYDRAULIC SPRING

[75] Inventors: William E. Richeson; Frederick L. Erickson, both of Fort Wayne, Ind.

[73] Assignee: North American Philips Corporation, New York, N.Y.

[21] Appl. No.: 715,069

[22] Filed: Jun. 13, 1991

[51] Int. Cl.⁵ .............. F01L 1/04; F16F 5/00; F16K 31/52
[52] U.S. Cl. .................. 251/48; 123/90.12; 123/90.66; 251/263; 251/337
[58] Field of Search .......... 123/90.12, 90.14, 90.27, 123/90.65, 90.66; 251/48, 54, 263, 337

[56] References Cited

U.S. PATENT DOCUMENTS

| | | | |
|---|---|---|---|
| 1,331,826 | 2/1920 | Shepherd | 123/90.66 |
| 1,427,111 | 8/1922 | Knudsen | 251/54 |
| 1,498,226 | 6/1924 | Beck | 251/54 |
| 1,596,276 | 8/1926 | Lane | 251/337 |
| 1,965,517 | 7/1934 | Vitalini | 123/90.12 |
| 2,936,002 | 5/1960 | Opletal et al. | 251/54 |
| 3,102,711 | 9/1963 | Filliung | 251/54 |
| 3,120,221 | 2/1964 | Lyons | 123/90.14 |
| 3,722,483 | 3/1973 | Overby | 123/90.14 |
| 4,312,494 | 1/1982 | Aoyama | 123/90.66 |
| 4,592,313 | 6/1986 | Speckhart | 123/90.65 |

FOREIGN PATENT DOCUMENTS

| | | | |
|---|---|---|---|
| 2364328 | 4/1978 | France | 123/90.14 |
| 2537207 | 6/1984 | France | 123/90.14 |
| 129729 | 7/1919 | United Kingdom | 123/90.14 |
| 209035 | 7/1924 | United Kingdom | 123/90.14 |

Primary Examiner—George L. Walton

[57] ABSTRACT

Valve assembly includes a stem having a first section toward the cam and a second section toward the valve face, the first section having a larger diameter than the second section. A housing defines a closed chamber having a first bore which closely receives said first section and a coaxial second bore which closely receives the second section. As the cam rotates to lift the valve face from the valve seat, the first section acts as a piston which increases pressure of hydraulic fluid in the chamber to provide a spring force to return the valve.

6 Claims, 2 Drawing Sheets

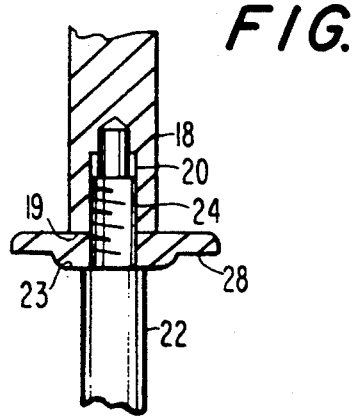
FIG. IA
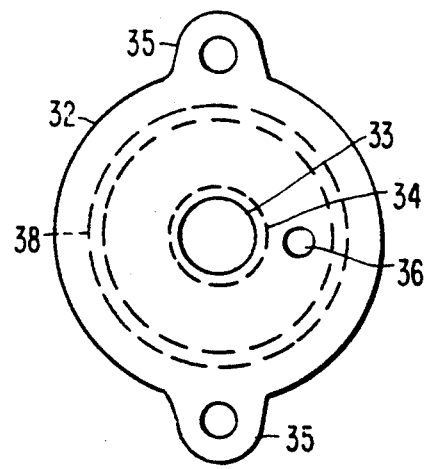
FIG. 2
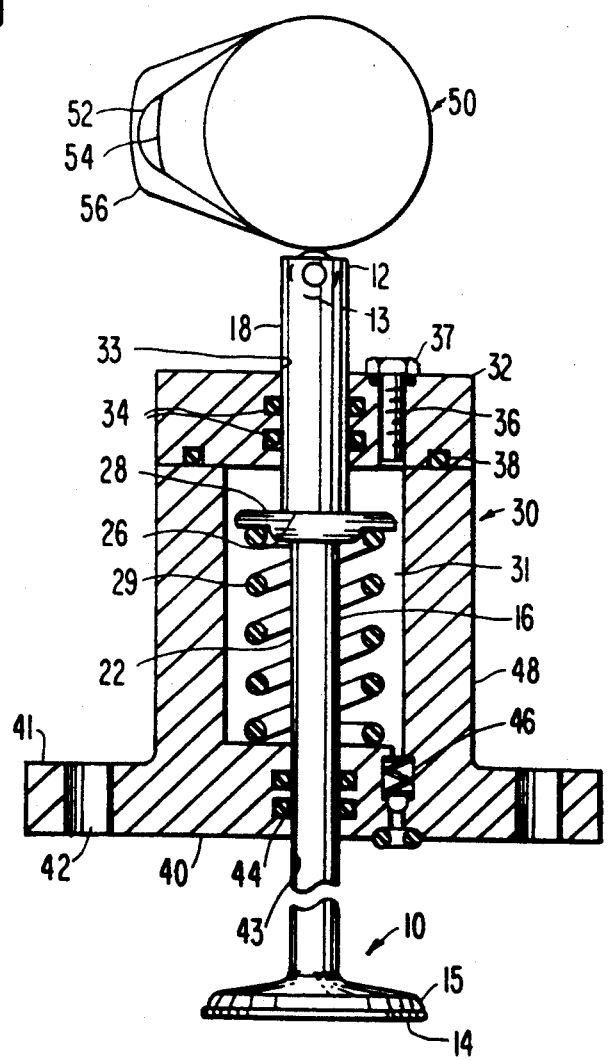
FIG. I

CAM ACTUATED VALVE ASSEMBLY WITH HYDRAULIC SPRING

BACKGROUND OF THE INVENTION

The present invention relates to a valve assembly wherein hydraulic pressure is used to provide the return force of a cam actuated valve. The inventive assembly is especially suitable for automotive use.

Cam operated engine valves are required to operate over a large RPM range, generally about 500 RPM to 5000 RPM. When using steel valves, the spring forces required for the valve gear to follow the cam over the required RPM range are about 100 to 300 lbs. The higher the RPM, or the more extreme the cam profile, the greater is the force required. An "extreme" profile, as the term is used herein, is one which causes sudden accelerations or decelerations of the valve during its reciprocatory motion.

Coil springs that are used in conventional valve assemblies have a complex distribution of mass and spring constants which cause them to start acting like poorly terminated transmission lines at the design limits, e.g. high RPM or with extreme cam profiles. Internal flexures and attendant complex resonances take place within the spring, causing internal surfaces of deflection which greatly affect the overall behavior of the spring and other valve gear. The behavior of the spring, in the extreme, could be analogized to that of a "Slinky" toy.

Valve seating velocity should increase linearly with engine speed. Due to the above described surging effects, however, there can be significant variations above and below the linearly determined seating velocity. When the valve no longer follows the cam, it is said to float, bouncing off the cam and against the valve seat. The resulting hammering of the cam and the valve seat can cause damage by cold working the surfaces, as well as wear resulting from removal of lubricants under the impact loading. Cold working of the exhaust valve and associated seat is exacerbated by the associated high temperatures.

A related problem is the scoring of the valve and valve seat due to the high gas pressure and velocity at the seat. As the seating deteriorates due to cold working and wear, the scoring is exacerbated. Poor seating and scoring cause the valve to get even hotter due to poor heat conduction to the seat.

In addition to the cold-working, wear, and scoring problems, valve float also causes inefficient engine operation due to randomness in the timing of the valve closure. This randomness can result in a loss of compression and a loss of expansion energy with attendant loss of engine power.

U.S. Pat. Nos. 3,120,221, 3,722,483, and 4,592,313 address the float problem by offering a pneumatic approach that requires a central air compressor. Due to the high compressibility of air, i.e., its low bulk modulus of elasticity, greater working displacements and more massive pistons are required.

SUMMARY OF THE INVENTION

According to the invention, a hydraulic spring provides the elastic force for returning the valve and otherwise maintaining it in contact with the cam. This is accomplished with a valve stem in two sections having two respective diameters. A first section of the stem toward a first end of the valve borne against by the cam has the larger diameter; a second section of the stem toward a second end bearing the valve face has the smaller diameter. The stem passes through a housing having a closed chamber via a first bore which closely receives the first section and a second bore which closely receives the second section. Seals are provided in the respective bores to maintain pressure when the chamber is filled with hydraulic fluid via a pluggable opening.

When the cam lobe bears against the first end to bring the second end off of the valve seat in the cylinder head, the first section acts like a first piston entering the chamber to increase the pressure in the hydraulic fluid. At the same time, the second section acts like a second, smaller piston retreating from the chamber.

According to a preferred embodiment, the assembly includes a coil spring in the chamber, and a spring retainer fixed to the stem between the first and second sections. This spring is quite light compared to conventional coil springs used in valve gear, and is provided only to assure positive seating of the valve face against the seat. As such, surging and other untoward spring behavior are not a concern.

The following equations permit determining the available valve closing force at peak valve lift:

$$F = \frac{S}{V}\left[\frac{\pi(A^2 - B^2)}{4}\right]^2 K$$

$$P = F\left[\frac{\pi(A^2 - B^2)}{4}\right]^{-1}$$

where
F = maximum hydraulic spring force
$\pi(A^2 - B^2)/4$ = difference in area between first and second sections.
S = maximum lift by cam
P = peak pressure
K = bulk modulus of hydraulic fluid
V = volume of fluid in chamber prior to lift.

EXAMPLE

If A = 0.375 in, B = 0.2 in, V = 2.5 in$^3$, and K = 250 × 10$^3$ (in$^3$/in$^3$) (lb/in$^2$), then F = 200 lb. and P = 2530 lb/in$^2$. The K value is a common one for hydraulic fluid; the in$^3$/in$^3$ dimension is sometimes referred to as the inverse shrinkage.

If the pressure of the hydraulic fluid is 40 psi when the valve is closed and the seating force provided by the coil spring is 40 lbs, the total seating force is 43 lbs. When the valve is open at peak lift, the force on the cam is about 200 lbs due to hydraulics and 50 lbs due to the spring, hence a total of 250 lbs.

Note in the above example that only 20% of the total force is provided by the coil spring, the compressed hydraulic fluid providing the overriding force to keep the valve in contact with the cam. Float is not a concern because at the desired spring rates the hydraulic fluid does not exhibit the complex behavior of metal springs. Further, since the coil spring is in a damping medium, its behavior is somewhat improved.

The inventive assembly will follow the cam at much higher rates than conventional valve springs. The superior performance of the hydraulic spring thus permits an added freedom in cam design, as will be described in conjunction with the drawings.

BRIEF DESCRIPTION OF THE DRAWINGS

FIG. 1 is an axial section of the valve assembly prior to compression of the hydraulic spring.

FIG. 1A is a partial section of the valve stem and retainer.

FIG. 2 is a plan view of the top portion of the housing.

DETAILED DESCRIPTION OF THE PREFERRED EMBODIMENT

Figure 3:
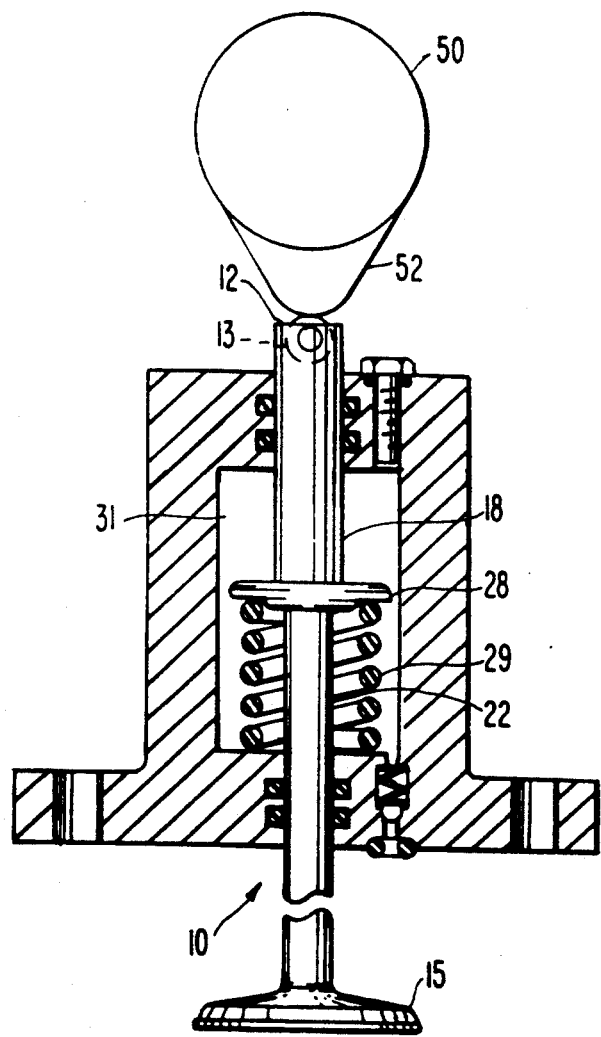
FIG. 3 is an axial section of valve assembly during compression of the hydraulic spring.

Referring to FIG. 1, the valve assembly comprises a valve 10 having a first end 10 with a follower 12 borne against by cam 50, a second end 14 with a valve face 15, and a stem 16 extending therebetween. The cam 50 is shown with three different possible profiles 52, 54, 56, of which profile 52 is most conventional. Details of the cylinder head including the valve guide and valve seat, not shown, are conventional.

The valve stem 16 includes a first section 18, toward first end 10 and a second section 22 between the first section 18 and the second end 14. The stem 16 has a first diameter which is uniform over the first section 18 and a second diameter which is uniform over the second section 22. The first diameter is larger than the second diameter, thereby creating a shoulder 26 between the sections 88, 22. The shoulder 22 provides an annular seat for a spring retainer 28.

FIG. 1A shows the assembly of the two-part valve stem 16 in greater detail. The first section 18 has a tapped bore 20 concentric to first shoulder 19, which bore receives a threaded extension 24 of second section 22. A second shoulder 23 on second section 22 serves to positively retain the spring retainer 28 between the two sections 18, 22.

Referring again to FIG. 1, the valve assembly further includes a housing 30 having a closed chamber 31 defined by a top portion 32 and a base 40. The top portion 32 has a first bore 33 which closely receives the first section 18 therethrough; sealing grooves 34 in the wall of this bore carry O-ring type seals which prevent leakage of hydraulic fluid from chamber 31. The base 40 has an upright cylindrical portion 48 and a second bore 43 which is coaxial with first bore 33 and closely receives second section 22 therethrough. Sealing grooves 44 in the wall of this bore also carry O-ring type seals. Flanges 41 having bores 42 serve to mount the housing base 40 to a cylinder head.

Referring also to FIG. 2, the top portion 32 has mounting flanges 35 for fixing portion 32 to base 40, the latter having corresponding vertical ribs with tapped holes for receiving bolts (not shown). Alternate arrangements including larger numbers of flanges and ribs are also possible. A circular groove 38 receives an O-ring type seal which prevents pressure loss between top portion 32 and base 40.

To assemble the valve assembly as depicted in FIGS. 1 and 1A, the housing base 40 would first be fixed to a cylinder head (not shown), followed by inserting the second section 22 through the valve guide and bore 43, placement of spring 29 and retainer 28, and screwing the first section 18 to second section 22. The top portion 32 with seals in place is then fixed to the cylindrical portion 48 of base 40 and the chamber 31 is filled with hydraulic fluid via bore 36, whereupon a bolt-like plug 37 with a further seal is installed in bore 36. The only remaining access to chamber 31 is via check valve 46, which can be used to increase hydraulic pressure via a hydraulic line (not shown) in the head. Additional valving to permit decreasing fluid pressure (and spring force) is also possible.

Cam profiles 54, 56 are considered extreme as compared to the more conventional profile 52. The profile 54 represents a reduced lift requiring reduced energy to operate the valves, but results in the same gas flow as profile 11 due to increased time at peak lift. Profile 56 has a higher rate of opening and relatively large dwell.

The profiles 54, 56 are hard to follow at high engine speeds with conventional metal springs due to the sharp corners which would cause surges and float as described in the summary. The hydraulic spring of the present invention, however, permits following such profiles over at high RPM. The efficiency of such springs remains high because the flow is a three dimensional flow; fluid velocities are low due to limited fluid displacement. High viscosity fluids further limit such displacements and turbulence, which can cause cavitation and unpredictable pressure at high RPM, especially at high temperatures.

FIG. 3 shows the valve assembly with the valve 10 at peak lift, at which time the section 18 has made its maximum ingress into cavity 31, thus acting as a hydraulic piston to increase the pressure in the fluid, which provides the spring force to return the valve. Note once again that spring 29 merely provides an auxiliary force to assure that the valve remains fully seated when it returns to the position of FIG. 1.

The foregoing is exemplary and not intended to limit the scope of the claims which follow.

What is claimed is:

1. Valve assembly for a cylinder in an internal combustion engine of the type having at least one cylinder with at least one valve seat and a cam which is rotated to reciprocate a valve to and from said seat, said assembly comprising a valve having a first end acted upon by said cam, an opposed second end brought to bear against said seat, and a stem extending between said ends, said stem having a first diameter which is uniform over a first section toward said first end and a second diameter which is uniform over a second section between said first section and said second end, said first diameter being larger than said second diameter, a housing having a closed chamber having a fixed volume defined by fixed rigid walls with opposed first and second coaxial bores which receive said stem therethrough so that said first and second ends are located externally of said chamber, said first bore closely receiving said first section, said second bore closely receiving said second section, said first and second diameters having a difference which is only sufficient to effect compression of a hydraulic fluid in said closed chamber during a complete rotation of said cam, whereby upon rotating said cam to move said first end toward said first bore and to lift said second end off said valve seat, the amount of said first section in said chamber increases while the amount of the second section in said chamber decreases, thereby decreasing the volume in said chamber not occupied by said valve stem by an amount sufficient to compress a hydraulic fluid in said chamber.

2. Valve assembly as in claim 1 further comprising hydraulic fluid in said chamber, said fluid being compressed as the amount of said first section in said chamber increases, thereby providing a spring action to return said valve.

3. Valve assembly as in claim 1 further comprising
a spring retainer fixed to said stem in said chamber, and
a coil spring in said chamber between said retainer and said second end of said valve.

4. Valve assembly as in claim 3 wherein said valve has an annular shoulder between said first section and said second section, said retainer being seated against said annular shoulder.

5. Valve assembly as in claim 1 wherein said valve comprises a first piece comprising said first end and said first section, and a second piece comprising a second end and said second section.

6. Valve assembly as in claim 1 further comprising a check valve in the wall of said housing for maintaining pressure of the hydraulic fluid in said chamber.

* * * * *